United States Patent [19] [11] 4,441,541
Block [45] Apr. 10, 1984

[54] METHOD OF AND APPARATUS FOR DETERMINING THE MELT LEVEL IN A CONTINUOUS-CASTING MOLD

[75] Inventor: Franz-Rudolf Block, Roetgen, Fed. Rep. of Germany

[73] Assignee: Arbed S.A., Luxembourg, Luxembourg

[21] Appl. No.: 357,275

[22] Filed: Mar. 11, 1982

[30] Foreign Application Priority Data

Mar. 18, 1981 [LU] Luxembourg ............................ 83 224
Aug. 3, 1981 [LU] Luxembourg ............................ 83 532

[51] Int. Cl.$^3$ ............................................ B22D 11/16
[52] U.S. Cl. ..................................... 164/453; 164/449; 164/450; 164/451
[58] Field of Search .............................. 164/449–451, 164/453

[56] References Cited

U.S. PATENT DOCUMENTS 3,519,060  7/1970  Vischulis ............................ 164/449
3,537,505  11/1970 Thalmann ............................ 164/449
4,175,612  11/1979 Baumert ............................. 164/453
4,212,342  7/1980  Linder ............................... 164/449

FOREIGN PATENT DOCUMENTS 342325   3/1978  Austria .
2101729  7/1971  Fed. Rep. of Germany .
2839953  3/1979  Fed. Rep. of Germany .

Primary Examiner—Gus T. Hampilos
Assistant Examiner—Richard K. Seidel
Attorney, Agent, or Firm—Karl F. Ross; Herbert Dubno

[57] ABSTRACT

The level of a melt in a vertically reciprocating continuous-casting mold is detected by a method wherein a nonhomogeneous steady magnetic field is formed extending horizontally through the mold into the melt generally at the melt level. This field is vertically reciprocated jointly and synchronously with the mold and its field strength is detected at a sensing location after the field passes through the mold. This location is also vertically reciprocated jointly and synchronously with the mold. The melt level is derived from the detected field strength, normally taking into account melt conductivity and relative displacement rate of the mold and melt. With the use of a steady field the effect of the mold is automatically eliminated as the field does not move appreciably relative to the mold, so it generates virtually no eddy currents in it that would generate secondary fields.

12 Claims, 3 Drawing Figures

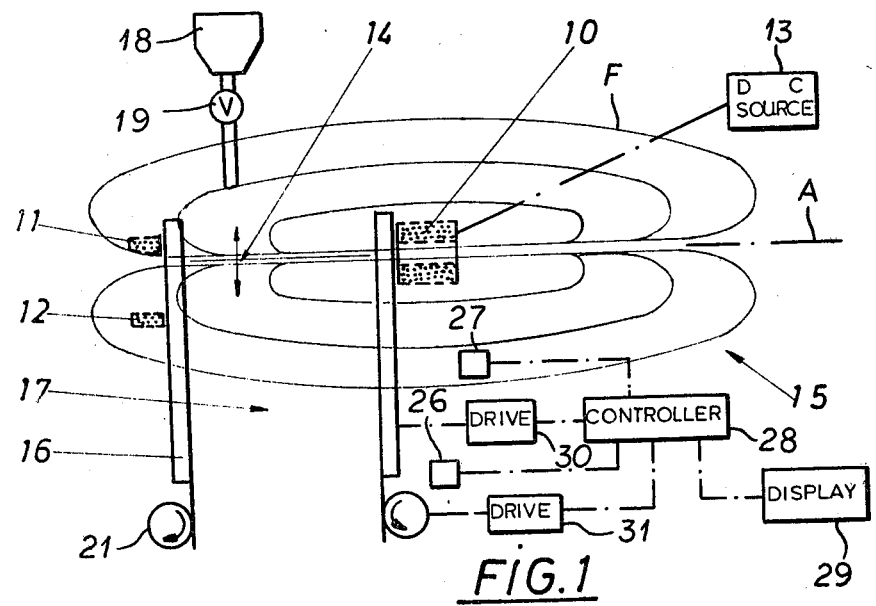
FIG.1
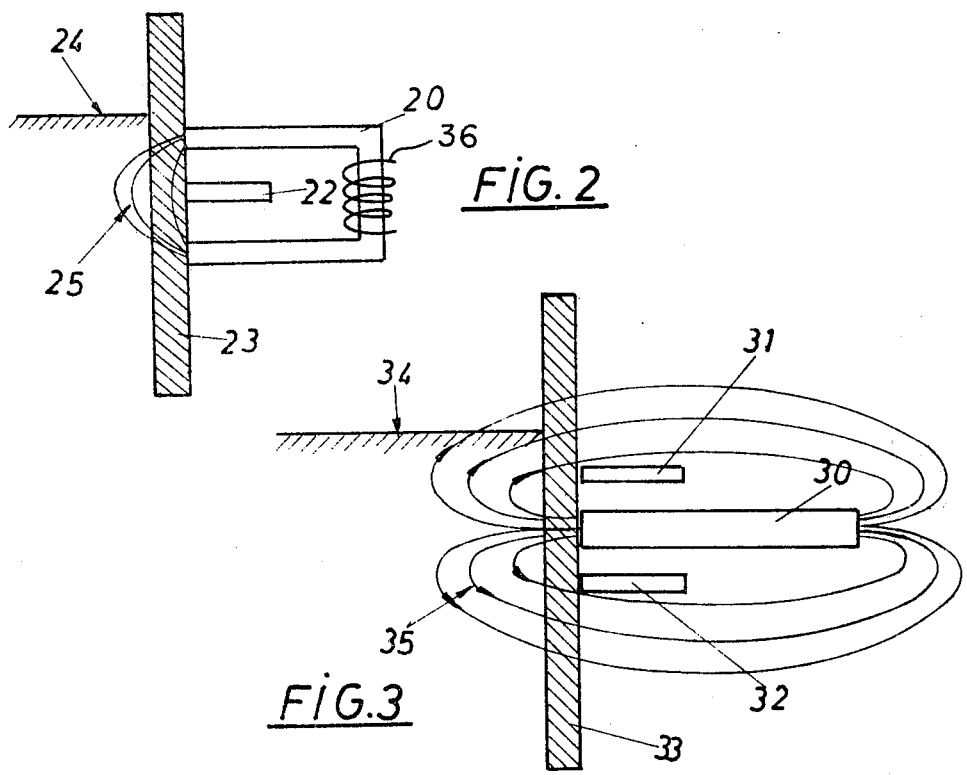
FIG.2
FIG.3

METHOD OF AND APPARATUS FOR DETERMINING THE MELT LEVEL IN A CONTINUOUS-CASTING MOLD

FIELD OF THE INVENTION

The present invention relates to the continuous casting of steel. More particularly this invention concerns a method of and an apparatus for measuring the melt level in a continuous-casting mold.

BACKGROUND OF THE INVENTION

In the continuous casting of steel to produce in a single operation shapes equivalent in section to conventional semifinished shapes, molten steel is poured from a tundish or ladle into the top of a cooled mold having a vertically throughgoing passage. The steel cools and at least its surface hardens in the mold, so that a cast strand can be pulled continuously by pinch rollers from the bottom of the mold. The mold is frequently reciprocated continuously vertically in order to prevent the casting from adhering to it, as such sticking could cause a breakout of molten steel in or below the mold. Between the lower end of the mold and the traction pinch rollers that pull the casting from the mold it is standard practice to spray water on the casting to harden it. This procedure, which is described in some detail in *The Making, Shaping and Treating of Steel* (H. E. McGannon; US Steel: 1971 p. 706ff), is extremely difficult to make work successfully for a long run, but represents such important economies in the production of steel that it is a highly developed art.

One of the parameters which is absolutely critical is the melt level, or the vertical level of the upper surface of the liquid steel in the mold. This level must be maintained above a lower limit so that the casting is sufficiently strong as it exits from the mold not to break out, and below an upper limit which would cause the mold to overflow or the casting to be so rigid as it exits the mold that, for example, it could not be bent. The range between these two limits is quite small, and there are only two principal ways to affect the melt level: by withdrawing the casting at a greater speed to lower it or more slowly to lift it, or by reducing the fill rate to lower it or increasing the fill rate to lift it.

Any such level measurer must operate under extremely adverse conditions of heat, airborne particles, and corrosive gases and vapors. In addition the level-measuring device must not interfere with pouring or vertical reciprocation of the mold, and must be able to determine melt level accurately when it is underneath a powder or slag layer, and even when the entire system is enclosed and filled with an inert or special treatment gas. In fact there is not at present any reliable level measurer which is usable in the continuous casting of billets or blooms.

German Patent document No. 2,101,729 describes a system that makes measurements of the currents that are induced in a conductor by a moving magnetic field. The secondary field of these induced currents can be sensed to determine the presence or position of this conductor.

Another system is described in French Pat. No. 2,251,811 which measures the impedance of a coil in whose moving alternating-current field an conductor is moved. This coil is juxtaposed with the top of the melt, which obviously is of conductive material while whatever above it is not, and can therefore roughly detect the melt level. To this end two U-shaped inductor cores are employed which are parallel to each other but whose coils are oppositely connected. Such inductors must be aligned with an opening or nonmagnetic window in the mold at the melt level. It is unfortunately impossible to provide such a window in a steel-casting mold which is normally made of thick water-cooled copper in which eddy currents wold form that would create a powerful secondary field completely masking the secondary field created by the eddy currents formed in the melt inside it. Arranging the system to hang down inside the mold has not worked out, as the level meter gets in the way and is quickly destroyed by the heat and corrosive chemicals generated by the process.

Commonly owned earlier U.S. Pat. No. 4,279,149 describes a method which eliminates the influence of the mold. In this system an alternating-current field-forming primary coil and two oppositely connected similar secondary coils as well as the liquid metal form a system in which the position of the melt level relative to the coils produces an induced voltage. The primary and secondary coils engage without contact coaxially around the mold without touching it. As a result of the position of the melt level, the voltages induced in the secondary coils as well as the electrical conductivity of the melt are measured, so that the detected voltage must be corrected for the particular conductivity to determine the melt level. Such an arrangement can only be used for small tubular molds due to the necessity of providing annular coils surrounding the mold and the difficulty of providing such arrangements on a large scale.

OBJECTS OF THE INVENTION

It is therefore an object of the present invention to provide an improved method of and apparatus for determining melt level in a continuous-casting mold.

Another object is the provision of such a method and apparatus which overcome the above-given disadvantages.

A further object is to provide such a method and apparatus which accurately determine melt level, even in a big mold, without blocking access to the mold or otherwise interfering with mold operation.

SUMMARY OF THE INVENTION

These objects are attained according to the instant invention in a method of detecting the level of a melt in a vertically reciprocating continuous-casting mold. With the method of this invention a nonhomogeneous steady magnetic field is formed extending horizontally through the mold into the melt generally at the melt level. This field is vertically reciprocated jointly and synchronously with the mold and its field strength is detected at a sensing location after the field passes through the mold. This location is also vertically reciprocated jointly and synchronously with the mold. The melt level is derived from the detected field strength, normally taking into account melt conductivity and relative displacement rate of the mold and melt.

With the use of a steady field, by which is meant a field produced by a permanent magnet or one produced by an electromagnet energized with direct current or alternating current of at most 10 Hz and preferably no more than 5 Hz, the effect of the mold is automatically eliminated. Since the field does not move appreciably relative to the mold, it generates virtually no eddy currents in it that would generate secondary fields. Thus the field simply passes through the normally nonmagnetic, e.g. copper, mold. The field will be affected by the ferrous melt however and this effect can be measured and from it can be derived the melt level. Several field sources can be used and when electromagnetic they can be connected in series.

The magnetic permeability of the liquid metal of the melt is normally similar to that of a vacuum, air, or a protective gas. Thus the magnetic permeability of the melt is largely irrelevant.

The melt conductivity is, however, quite important. The slag layer sitting atop the melt above the melt level is substantially less conductive than the melt itself, and the air or gas above that is so little conductive that its conductivity is not taken into account. Thus with the same boundary conditions eddy currents induced in the liquid-metal melt will be very large compared to those induced in the slag or air, or that would flow in the slag or air assuming somehow it were possible to insert electrodes to make such a test.

The field, sensing location, and mold form a system whose parts do not move relative to each other, but which moves relative to the descending melt, so that voltages are generated in the moving melt. In a nonhomogeneous field these voltages lead to currents whose excitation overlies the primary excitation which slowly waxes and wanes with the mold-reciprocation rate which is normally about 1 Hz and rarely more than 2 Hz. The induced current density is stronger as the electrical conductivity increases. Thus the measured signals are related to the conductivity.

The primary time-independent or only slowly changing induction is varied so slowly that it penetrates through the wall of the mold to the sensor and there can be picked up by known methods so as to continuously derive the melt level. The relative speed between the conductor—the melt—and the time-constant induction—the field—is proportional to the field changes. This speed, as well as the advance rate for the melt strand, can be sensed easily by standard inductive devices or any commercially available motion detector and measurer. According to further features of this invention the conductivity of the melt is determined as well as the relative speed between the melt and the mold and respective outputs are formed which correspond to them. The melt level is then derived from these outputs and the detected field strength.

According to this invention the effect of the moving melt as well as any background magnetism are eliminated. This can be done in a system wherein the field strength is sensed at a plurality of locations to produce a plurality of outputs which are combined so that the melt level can be derived from the combined outputs. More particularly the field strength is sensed at two locations that are vertically offset from each other. The field strength detected at one of the locations is then substracted from that detected at the other location so that the melt level can be derived from the difference between the field strengths. In this system it is not necessary to measure the displacement rates of the mold and/or the melt, as the effect of such motion is automatically eliminated.

In accordance with another feature of this invention the detector and magnet means are on opposite sides of the mold. They may also be on the same side of the mold. The magnet is arranged in the middle of the side of the mold, level with the normal location for the top of the melt. The magnet is surrounded by magnetic or nonmagnetic materials which form the desired fields. Thus the magnet is mounted generally in the same manner as a radiation gun in a radioactive system, with the sensors taking the place of the geiger-counter readers. According to this invention the sensors may be simple coils, Hall-effect transducers, or satured-core magnetometers.

DESCRIPTION OF THE DRAWING

The above and other features and advantages will become more readily apparent from the following, reference being made to the accompanying drawing in which:

FIG. 1 is a largely diagrammatic view and axial section through a system for carrying out the method of this invention; and FIGS. 2 and 3 are vertical sections through further systems according to the invention.

SPECIFIC DESCRIPTION

As seen in FIG. 1 an electromagnet 10 energized by a direct-current source 13 is fixed to one side of a vertically tubular copper water-cooled mold 16 in the upper end of which liquid steel is poured from a tundish 18 through a gate valve 19 to form a vertical strand 17 having a melt level or upper surface 14 normally generally at the same vertical level as the magnet 10. Pinch rollers 21 operated by a drive 31 pull the hardened lower region of the strand 17 downward out of the mold 16 which is vertically reciprocated at a rate of 1 Hz by a drive 30.

On the opposite side of the mold 16 above and below the level of the center of the electromagnet 10 are two magnetic detectors 11 and 12 of the coil type that are connected in circuit opposition, that is they are connected so the polarity of the signal of one is of opposite the polarity of the other. They are connected to a controller 28 also connected to the drives 30 and 31. In addition inductive speed sensors 26 and 27 juxtaposed respectively with the strand 17 and mold 16 are connected to this controller 28. A microprocessor in the controller 28 processes the incoming information as will be described below and displays the result at 29.

In use the magnet 10 forms a steady nonhomogeneous field F that passes through the mold 16 and strand 17 to the detectors 11 and 12 along an axis A perpendicular to the vertical axis of the mold 16. The strand 17 meanwhile is moving downward at a constant rate and the mold 16 is being vertically reciprocated at a constant rate. The system formed by the magnet 10, mold 16, and sensors 11 and 12 therefore reciprocates adjacent the melt level 14. This reciprocation of the system 11, 12, 14, and 16 is detected by the sensor 27 and transformed into an output that is fed to the controller 28, as is an output from the sensor 26 indicating the downward travel rate of the strand 17.

Since the field F does not move relative to the copper mold 16, it generates no eddy currents in this part, and therefore no secondary field is in turn generated by these eddy currents. If the field F is formed electromagnetically, such a very low frequency, normally no more than 5 Hz, is used that virtually no eddy currents form in the mold. This field F also passes through air or slag above the level 14 and liquid steel below it. Since slag and air are both relatively nonconductive no appreciable eddy currents that in turn generate secondary magnetic fields form above this level so that the field intensity detected by the upper sensor 11 so long as it is wholly above this level 14 is basically only that of the primary field generated by the magnet 10. Below the level 14, however, the field F passes through the liquid steel melt 17 which is highly conductive. As a result eddy currents and the resultant secondary fields are formed below the level 14, so that the lower sensor 12 senses these fields and produces a corresponding output for the controller 28.

Assuming that the sensors 11 and 12 are equispaced above and below the level 14, the difference between the outputs they produce will be directly related to the position of the level 14 relative to the mold 16. The controller corrects this for the position of the mold 16 as determined by the sensor 27 and displays the result at 29. The effect of the moving strand 17 is therefore completely canceled out with this two-sensor system. Any other magnetic field can be eliminated by subtracting from the outputs of the two sensors 11 and 12 a signal corresponding to the background magnetism at a nearby location outside the field F.

Obviously the two outputs of the sensors 11 and 12 will increase and decrease as they move up and down relative to the level 14. This rise and fall can be compared by the controller 28 with the mold-speed rate as determined by the sensor 27 to cancel out its effect on the reading. Similarly it is possible to determine from the sensor 26 the effect on the reading caused by the downward advance and eliminate this from the reading using standard computer procedures.

The controller 28 is also connected to the valve 19 and drive 31 so that if it senses that the level is too high or too low, it can vary either the feed rate through the valve 19 or the withdrawal rate by the rollers 21 to correct it. It is possible in this manner to have wholly automatic melt-level regulation.

In FIG. 2 a U-shaped permanent magnet 20, which may have a 3 Hz alternating-current tickler coil 36 is provided with its poles vertically spaced below the level 24 in a mold 23. This produces a magnetic field 25 whose horizontal field component is very dependent on height. A Hall-effect sensor 22 is positioned on the same side of the mold 23 vertically equispaced between the poles of the magnet 20. The field intensity detected by this sensor 22 will be directly related to liquid level so long as the field 25 does not lie wholly below the level 24.

The arrangement of FIG. 3 has a bar magnet 30 fixed in horizontal position adjacent a mold 33 below the normal melt level 34 therein. This magnet 30 generates a field 35 that passes through upper and lower sensors 31 and 32 roughly equivalent to the sensors 11 and 12. Differentiating the signals from the sensors or eliminating the common element gives very accurate results with this system.

Although the sensors and magnets are all shown mounted right on the respective molds, it is not necessary to do so. They could have their own actuators operated synchronously with the mold drive, or could be carried on the same vertically reciprocal support table as the mold.

With the system according to this invention, therefore, it is possible to accurately measure the vertical position of the melt level from outside the mold. The effect of the mold on the reading is wholly eliminated by using a steady field that either is wholly stationary relative to the mold or that moves so slowly as to generate no appreciable eddy currents therein. The system is very simple and has no moving parts, so that it can be expected to operate accurately for a long time.

I claim:

1. A method of detecting the level of a melt in a vertically reciprocating continuous-casting mold, said method comprising the steps of concurrently:
    forming a nonhomogeneous steady magnetic field extending horizontally through said mold into said melt generally at the melt level, said steady field not moving appreciably relative to the mold and generating substantially no eddy currents therein;
    vertically reciprocating said field jointly and synchronously with said mold;
    detecting the field strength of said field at a sensing location after said field passes through said mold;
    vertically reciprocating said location jointly and synchronously with said mold; and
    deriving said melt level from the detected field strength.

2. The method defined in claim 1 wherein said field strength is sensed at a plurality of such locations to produce a plurality of outputs, said method further comprising the step of combining said outputs, said melt level being derived from the combined outputs.

3. The method defined in claim 1 wherein said field strength is sensed at two such locations that are vertically offset from each other, said method further comprising the step of subtracting the field strength detected at one of said locations from that detected at the other location, said melt level being derived from the difference between said field strengths, whereby the field generated by downward advance of said melt is eliminated.

4. The method defined in claim 1 wherein said field has a frequency of less than 10 Hz.

5. The method defined in claim 1, further comprising the steps of
    determining the conductivity of said melt and the relative speed between said melt and said mold and forming respective outputs corresponding thereto, said melt level being derived from said outputs and said detected field strength.

6. An apparatus for detecting the level of a melt in a vertically reciprocating continuous-casting mold, said apparatus comprising:
    magnet means attached to the mould for forming a steady and nonhomogeneous magnetic field extending horizontally through said mold into said melt generally at the melt level, said steady field not moving appreciably relative to said mold and generating substantially no eddy currents therein;
    means for vertically reciprocating said field jointly and synchronously with said mold;
    field sensor means for detecting the field strength of said field at a sensing location after said field passes through said mold;
    means for vertically reciprocating said location jointly and synchronously with said mold; and
    control means for deriving said melt level from the detected field strength.

7. The apparatus defined in claim 6, further comprising speed sensor means for detecting the displacement rate of said mold, and for feeding the detected rate to said control means, said control means employing the detected rate also to derive said melt level.

8. The apparatus defined in claim 6 wherein said detector and magnet means are on opposite sides of said mold.

9. The apparatus defined in claim 6 wherein said detector and magnet means are on the same side of said mold.

10. The apparatus defined in claim 6 wherein said magnet is a permanent magnet.

11. The apparatus defined in claim 6 wherein said magnet is an electromagnet.

12. The apparatus defined in claim 6, further comprising speed sensor means for detecting the displacement rate of said melt, and for feeding the detected rate to said control means, said control means employing the detected rate also to derive said melt level.

* * * * *